United States Patent [19]

Togino

[11] Patent Number: 5,801,885
[45] Date of Patent: Sep. 1, 1998

[54] HEAD MOUNT TYPE IMAGE DISPLAY UNIT

[75] Inventor: Takayoshi Togino, Koganei, Japan

[73] Assignee: Olympus Optical Co., Ltd., Tokyo, Japan

[21] Appl. No.: 547,871

[22] Filed: Oct. 25, 1995

[30] Foreign Application Priority Data

Oct. 26, 1994 [JP] Japan .................. 6-262653

[51] Int. Cl.$^6$ .................. G02B 27/14
[52] U.S. Cl. .................. 359/630; 359/633; 359/638; 359/631
[58] Field of Search .................. 359/630, 631, 359/632, 633, 638, 639, 640, 737, 717, 729, 730, 731

[56] References Cited

U.S. PATENT DOCUMENTS

| Re. 27,356 | 5/1972 | Russa | 359/631 |
| 3,443,858 | 5/1969 | Russa | 359/631 |
| 4,653,875 | 3/1987 | Hines | 359/631 |
| 4,874,214 | 10/1989 | Cheysson et al. | 372/5 |
| 5,459,612 | 10/1995 | Ingleton | 359/630 |
| 5,517,366 | 5/1996 | Togino | 359/850 |
| 5,552,922 | 9/1996 | Magarill | 359/224 |

FOREIGN PATENT DOCUMENTS 583 116  2/1994  European Pat. Off. .

Primary Examiner—Georgia Y. Epps
Assistant Examiner—Ricky Mack
Attorney, Agent, or Firm—Cushman Darby & Cushman IP Group of Pillsbury; Madison & Sutro LLP

[57] ABSTRACT

The invention provides an optical system which is well corrected in terms of both curvature of field and coma at a field angle of about 120° and a pupil diameter of about 15 mm and may be applied to both image pickup and ocular systems. Dioptric elements 11 are located the pupil plane side E and/or image plane side I of a concentric element 12 including two semitransparent surfaces 121 and 122, said two semitransparent surfaces 121 and 122 being concave on the pupil plane side E and located such that they transmit light at least once and reflect light at least once.

12 Claims, 15 Drawing Sheets

43 Semitransparent thin film
41 Substrate (glass)

44 Polarizing semitransparent thin film
41 Substrate (glass)

HEAD MOUNT TYPE IMAGE DISPLAY UNIT

BACKGROUND OF THE INVENTION

The present invention relates generally to an optical system which can be used as an ocular or image-forming system, and more particularly to an optical system which is reduced in terms of both curvature of field and coma and has an improved resolution even at a wide field angle and a large pupil diameter.

The applicant has already filed Japanese Patent Application No. 5(1993)-264828 for an optical system which enables curvature of field and coma to be almost completely corrected by filling vitreous material or the like between at least two semitransparent curved surfaces to facilitate its production and increasing the distance between two semitransparent concave surfaces. Even with the optical system disclosed in the above patent application, however, curvature of field and coma become noticeable when the angle of view is as wide as about 100° and the pupil diameter is as large as about 100 mm.

An account will now be given of why off-axis aberrations are produced in the optical system disclosed in Japanese Patent Application No. 5-264828 with reference to an optical path diagram shown in FIG. 4.

In FIG. 4, reference numeral 1 represents a semitransparent concave surface located in the vicinity of a pupil plane E and 2 a semitransparent concave surface located in the vicinity of an image plane I. A beam of rays is transmitted through or reflected at each surface in the order of 1-1, 2-1, and 2-2. The beam of rays is subjected to refraction at 1-1 and 2-2, and to reflection at 1-2 and 2-1.

How to compensate for coma will first be explained. To reduce or substantially eliminate the occurrence of coma at the image plane I, it is important to reduce the quantity of coma occurring at 1-1 and 2-1 where a beam of off-axis rays is first incident on the respective semitransparent surfaces 1 and 2. The optical axis length from the pupil E to the surface 1 is shorter than that from the pupil 1 to the surface 2. To reduce the angle of incidence of the beam of off-axis rays at 1-1 and 2-1 and reduce the difference in the angle of incidence between an off-axis marginal ray above the optical axis and an off-axis marginal ray below the optical axis, thereby reducing the quantity of coma produced, it is required that the surface 1 be stronger in power than the surface 2 and a curvature difference be between the surfaces 1 and 2.

To reduce the quantity of coma occurring at 1-2 and 2-2 where the beam of off-axis rays are again incident on the respective semitransparent surfaces, too, the power of the surface 1 should be stronger than that of the surface 2. This is because when the power of the surface 1 is too weak, the angle of inclination of the normal of the surface 1 becomes small with respect to the optical axis; so the angle of incidence of an off-axis chief ray at 1-2 becomes large. As a result, there is a large difference in the angle of incidence between the marginal rays above and below the optical axis, which otherwise gives rise to some considerable coma. It is here noted that the image-forming system disclosed is an almost telecentric one on the image side. When the power of the surface 2 is too strong, it is located nearly parallel to the optical axis; so the angle of an off-axis chief ray incident on 2-2 becomes large, resulting in a large difference in the angle of incidence between the marginal rays above and below the optical axis and hence giving rise to some considerable coma. To reduce the quantity of coma occurring at 1-2 and 2-2, it is then required that the power of the surface 1 be strong and the power of the surface 2 be weak.

Reference will now be made to where curvature of field takes place primarily and how to compensate for it. The largest curvature of field is negative curvature of field produced upon reflection at 1-2, and positive curvature of field produced upon reflection at 2-1. To inhibit the occurrence of curvature of field at the image plane 1, it is required that uniform power be imparted to the surfaces 1 and 2, so that the negative curvature of field produced upon reflection at the surface 1 and the positive curvature of field upon reflection are the surface 2 can be offset each other.

In the optical system disclosed in Japanese Patent Application No. 5-264828, how to correct coma is in contradiction to how to correct curvature of field, as already mentioned. In other words, it is difficult to correct both the aberrations at the same time. If the field angle and pupil diameter are not particularly large, it is then possible to correct curvature of field and coma by placing the powers of both semitransparent concave surfaces 1 and 2 in a well balanced state. When the field angle and pupil diameter are large, however, difficulty is involved in preventing curvature of field and coma from becoming worse.

SUMMARY OF THE INVENTION

In view of the problems associated with the optical system disclosed in Japanese Patent Application No. 5-264828 filed by the applicant, the present invention has been accomplished for an optical system including first and second surfaces 201 and 202 with the convex surface lying in a direction shown by an arrow 200, as can be seen from FIG. 22(a). In particular, a concentric system (element) wherein the center of curvature 201a of a first surface 201 and the center of curvature 202a of a second surfaces 202 are located side by side on the same optical axis 203, as illustrated in FIG. 22(b), is desired because more improved aberration performance is achieved. Then, an object of the present invention is to provide an optical system which is well corrected in terms of both curvature of field and coma at a field angle of about 120° and a pupil diameter of about 15 mm and can be used for both image pickup and ocular systems.

Another object of the present invention is to provide a head mount type of image display unit which is compact and has a wide field angle.

To achieve the objects above mentioned, the optical system according to the present invention is characterized in that at least one dioptric element is located in the vicinity of a concentric element including at least two semitransparent surfaces, said at least two semitransparent surfaces being concave on the pupil plane side and located such that they transmit light at least once and reflect light at least once.

In one preferable embodiment of the present invention, it is desired that a dioptric element having power be located on the pupil plane side of the concentric element and the following conditions (1) and (2) be satisfied as well.

$$f_1 > 0 \tag{1}$$

$$|1/R_{o1}| < |1/R_{o2}| \tag{2}$$

Here, $f_1$ is the focal length of the dioptric element having power, $R_{o1}$ is the radius of curvature thereof on the pupil plane side, and $R_{o2}$ is the radius of curvature thereof on the image plane side.

In another preferable embodiment of the present invention, it is desired that a dioptric element having power be located on the image plane side of the concentric element and the following conditions (3), (4) and (5) be satisfied as well.

$$1/R_{11} < 0 \quad (3)$$

$$1/R_{12} < 0 \quad (4)$$

$$|1/R_{12}| < |1/R_3| \quad (5)$$

Here, $R_{11}$ is the radius of curvature of the dioptric element having power on the pupil plane side, $R_{12}$ is the radius of curvature thereof on the image plane side, and $R_3$ is the radius of curvature of the semitransparent curved surface of the concentric element located on the image plane side.

One head mount type of image display unit according to the present invention includes an image display unit body having an image display device for displaying an image and an ocular system for guiding an image displayed on said image display device to the eyeballs of a viewer, and a support member mounted over the head of the viewer while it is in contact therewith, so that said image display unit body is held just before the face of the viewer, characterized in that:

said ocular system includes, in order from the eye side of the viewer along the visual axis, a first prism having a first surface concave on the eye side and a second surface concave on the eye side with a medium having a refractive index (n) larger than 1 (n>1) interposed therebetween, and a second prism having a third surface concave on the eye side and located on the side opposite to the eye side and a medium having a refractive index (n) larger than 1 (n>1), said first prism being designed such that a beam of rays leaving said image display device is reflected at at least said first surface and then propagates through the medium of said first prism in a direction opposite to the eye side, while a beam of rays reflected at said second surface propagates through the medium of said first prism and then transmits through said first surface.

Another head mount type of image display unit according to the present invention includes an image display unit body having an image display device for displaying an image and an ocular system for guiding an image displayed on said image display device to the eyeballs of a viewer, and a support member mounted over the head of the viewer while it is in contact therewith, so that said image display unit body is held just before the face of the viewer, characterized in that:

said ocular system includes, in order from the eye side of the viewer along the visual axis, a first prism having a first surface which has a shape concave on the eye side and has an action on both reflecting and transmitting a beam of rays, a second surface which has a shape concave on the eye side and has an action on both reflecting and transmitting a beam of rays and a medium interposed between said first and second surfaces and having a refractive index (n) larger than 1 (n>1), and a second prism having a third surface concave on the eye side and located on the side opposite to the eye side and a medium having a refractive index (n) larger than 1 (n>1).

Reference will now be made to why the above-mentioned arrangements are adopted and how they work. The optical system of the present invention will now be explained chiefly with reference to an image-forming system for simplicity of illustration. As will be obvious to those skilled in the art, however, the optical system of the present invention may be used as an ocular system with an object point defined by an image plane; in other words, the optical system of the present invention may function as an ocular system, if the construction of the image-forming system is reversed. With regard to the signs of curvature of field and coma, the present invention will also be explained following the definition set forth in Y. Hayami, "Optics I for Optical Equipment" (the Optomechatronics Association).

The reason why the occurrence of various aberrations is reduced in an optical system having such curvature that the convex surface lies in a substantially identical direction, especially in a concentric system (element) is mentioned in Japanese Patent Application No. 5-264828. However, this optical system has reduced aberrations but, instead, is low in terms of the degree of freedom of power distribution. For instance, when there are some limitations such as a limitation to total lens length with respect to focal length, the relation between the radii of curvature of two semitransparent surfaces becomes ill-balanced, so making it difficult to make satisfactory correction for curvature of field. According to the present invention, an optical system having reduced curvature of field is achieved by adding a dioptric element(s) to the concentric system (element), thereby correcting a Petzval's sum.

A specific arrangement wherein the dioptric element is located on the pupil plane side of the concentric element will first be explained with reference to FIG. 1.

FIG. 1 is an optical path diagram of the arrangement wherein the dioptric element having power is located in contact with the pupil plane side of the concentric element. Reference numeral 11 represents a dioptric element having power, 12 a concentric element constructed from two semitransparent curved surfaces concave on a pupil plane side E, 111 a refracting surface of the dioptric element 11 having power, which is located on the pupil plane side E, 121 the semitransparent curved surface of the concentric element 12 located on the pupil plane side E, and 122 the semitransparent curved surface of the concentric element 12 located on an image plane side I.

With an arrangement consisting of the concentric element 12 alone, difficulty is involved in correcting curvature of field and coma when the angle of view exceeds 90°. If the angle of view is about 60°, however, it is then possible to make sufficient correction for both the aberrations. To make the angle of view wide, therefore, is achieved by use of the dioptric element which serves to refract a beam of off-axis rays toward the pupil plane side E of the concentric element 12 with positive power, thereby reducing the field angle of the beam of off-axis rays incident on the concentric element 12. Then, it is important to take care of the shape of the dioptric element 11 having positive power; that is, it is important to use the dioptric element 11 in the form of a plano-convex lens, thereby minimizing an adverse influence on the concentric element 12. This is because by allowing the surface 111 to have a shape close to a planar shape, a beam of off-axis rays are largely reflected at the surface 111 so that the field angle of the off-axis rays incident on the concentric element 12 can be reduced, irrespective of the fact that the surface 111 is almost unlikely to yield curvature of field and coma. By placing the indices of refraction of the vitreous materials forming the dioptric and concentric elements 11 and 12 in a well balanced state, the curvature of field produced upon refraction at the surface 121 can be made either positive or negative; so the quantity of the curvature of field produced can be readily controlled. Thus, the curvature of field produced upon reflection at the surfaces 121 and 122 and upon refraction at the surface 122 can be easily corrected at the surface 121.

More exactly, it is important that the arrangement wherein the dioptric element 11 having power is located on the pupil plane side of the concentric element 12 conform to the following conditions (1) and (2):

$$f_1 > 0 \quad (1)$$

$$|1/R_{o1}| < |1/R_{o2}| \quad (2)$$

Here, $f_1$ is the focal length of the dioptric element 11, $R_{o1}$ is the radius of curvature thereof on the pupil plane side E, and $R_{o2}$ is the radius of curvature thereof on the image plane side I.

In FIG. 1, the dioptric element 11 is shown to be cemented to the concentric element 12. Even when the dioptric element 11 is spaced away from the concentric element 12, however, it is again important that the above-mentioned conditions (1) and (2) are satisfied. When there is air between the dioptric element 11 and the concentric element 12, curvatures of field of opposite signs are produced upon refraction at the refracting surface of the dioptric element 11 located on the image plane side I and the surface 121. By placing these two surfaces in a well-balanced state, therefore, positive or negative curvature of field can be freely produced by the time a beam of off-axis rays is incident from the refracting surface of the dioptric element 11 located on the image plane side I on the surface 121. In other words, even when the dioptric element 11 comes in no cemented contact with the concentric element 12, the same actions as above mentioned can be achieved by conforming to the above-mentioned conditions (1) and (2).

Another specific arrangement wherein the dioptric element is located on the image plane side of the concentric element made up of two semitransparent curved surfaces concave on the pupil plane side E will then be explained with reference to FIG. 2.

FIG. 2 is an optical path diagram of the arrangement wherein a dioptric element having power is spaced away from the image plane side of a concentric element constructed from two semitransparent curved surfaces concave on the pupil plane side. Reference numeral 13 represents a dioptric element having power, 12 a concentric element, 131 a refracting surface of the dioptric element 13 located on the pupil plane side E, 132 a refracting surface of the dioptric element 13 located on the image plane side I, 121 the semitransparent curved surface of the concentric element 12 located on the pupil plane side E, and 122 the semitransparent curved surface of the concentric element 12 located in the image plane side I.

This arrangement is likely to yield off-axis aberrations such as curvature of field and coma in the concentric element 12, because the field angle of a beam of off-axis rays incident on the concentric element 12 remains large. As already explained with reference to the prior art, how to correct curvature of field is in contradiction to how to correct coma. When the field angle of a beam of off-axis rays incident on the concentric element 12 is large, the powers of the surfaces 211 and 122 are likely to become ill-balanced. In particular, the surface 122 must have some strong power so as to correct curvature of field. A telecentric arrangement on the image side, for instance, this arrangement, is likely to yield excessive coma when a beam of off-axis rays undergoes refraction at the surface 122, because the angle of an off-axis chief ray incident on the surface 122 with respect to the optical axis is small. Due to correction for coma, the powers of the surfaces 121 and 122 become ill-balanced, thus causing curvature of field to remain.

To avoid this, the off-axis aberrations remaining in the concentric element 12 are compensated for by the provision of the dioptric element 13 on the image plane side I of the concentric element 12. It is then required that the curvature of field and coma produced at the concentric element 12 be concurrently compensated for in view of the shape of the dioptric element 13; so it is important that the dioptric element 13 is made up of a meniscus lens concave on the pupil plane side E. By use of the dioptric element 13 in the form of a meniscus lens, curvatures of field of opposite signs are produced at the front and rear surfaces 131 and 132 of the lens. By a suitable choice of the balance of power between the surfaces 131 and 132, the dioptric element 13 can produce positive or negative curvature of field, so that the curvature of field remaining in the concentric element 12 can vanish readily.

For correction of coma, it is important that the power of the refracting surface 132 of the meniscus lens 13 located on the image plane side I is weaker than that of the surface 122. By allowing the surface 122 to have power, it is prima facie possible to reduce the quantity of coma produced upon reflection at the surface 122. However, much coma occurs because the power of the surface 122 becomes too strong upon refraction at the surface 122. Such coma at the image plane I can be reduced if the surfaces 122 and 132 play different roles, viz., if the surface 122 plays a main role in reducing the quantity of coma produced upon the reflection of a beam of off-axis rays and if the surface 132 plays a main role in reducing the quantity of coma produced upon the refraction of a beam of off-axis rays. In short, a part of the large coma produced at the surface 122 is offset by the surface 131 by making the power of the surface 132 weaker than that of the surface 122, thus making it possible to produce the quantity of coma needed for offsetting the coma produced at the concentric element 12 by the surface 132.

More exactly, it is important to satisfy the following conditions (3), (4) and (5):

$$1/R_{11} < 0 \quad (3)$$

$$1/R_{12} < 0 \quad (4)$$

$$|1/R_{12}| < |1/R_3| \quad (5)$$

Here, $R_{11}$ is the radius of curvature of the pupil-side refracting surface 131 of the dioptric element 13 having power, located on the image plane side I, $R_{12}$ is the radius of curvature of the refracting surface 132 thereof on the image plane side I, and $R_3$ is the radius of curvature of the semitransparent curved surface of the concentric element 12 located on the image plane side I. In the ocular system, the conditions (3) and (4) are respectively rewritten as $$1/R_{11} > 0$$

$$1/R_{12} > 0$$

The power of the meniscus lens 13 is either positive or negative depending on the powers of the front and rear refracting surfaces 131 and 132 thereof. Since aberrations of opposite signs are produced at the front and rear refracting surfaces of 131 and 132 of the meniscus lens 13, however, it is required that the front and rear refracting surfaces 131 and 132 of the meniscus lens 13 have different powers so as to make correction for aberrations produced at the two semitransparent curved surfaces 121 and 122; so the power of the meniscus lens 13 is in no sense zero.

In the arrangement shown in FIG. 2, the dioptric element 13 is in no cemented contact with the concentric element 12. Even when the dioptric element 13 and optical system 12 are in cemented contact with each other, however, it is important to conform to the above-mentioned conditions (4) and (5). When the dioptric and concentric elements 13 and 12 are brought into cemented contact with each other, the surface 122 has power enough to inhibit coma upon reflection thereat while the surface 132 has power enough to inhibit coma upon refraction thereat, because off-axis aberrations hardly occur upon refraction at the surface 121. In other words, even when the dioptric element 13 comes into cemented contact with the concentric element 12, the same actions as above mentioned are achievable by conforming to the above-mentioned conditions (4) and (5).

It is noted that when the concentric element 12 with the dioptric element 13 of power located on the image plane side I is used as the ocular system of a head mount type of image display unit, the radius of curvature $R_{12}$ of the refracting surface 132 of the dioptric element 13 located on the image plane side I should preferably be such that the curved surface is concave on the pupil plane side E, as is the case with the radius of curvature of the semitransparent curved surface 121 located on the pupil plane side E of the concentric element 12. For the head mount type of image display unit that needs an extra space, is heavy and is to be mounted over the head, it is very desired that the refracting surface 132 of the dioptric element 13 located on the image plane side I is either a planar surface or a curved surface concave on the image plane side I.

More preferably, and to obtain an image of higher resolution, the following condition should be satisfied.

For the arrangement wherein the dioptric element 11 having power is located on the pupil plane side E of the concentric element 12 made up of two semitransparent curved surfaces concave on the pupil plane side E, it is important to conform to the following condition (6):

$$0 < f_2/f_1 < 0.42 \qquad (6)$$

Here $f_1$ is the focal length of the dioptric element 11 having power and $f_2$ is the focal length of the concentric element 12.

When the value of the above condition (6) exceeds the upper limit of 0.42, negative curvature of field produced at the concentric element 12 is undercorrected by the dioptric element 11; so the negative curvature of field becomes noticeable on the image plane I. When the value of the above condition (6) is below the lower limit of 0, on the contrary, positive curvature of field produced at the concentric element 12 is undercorrected by the dioptric element 11; so the positive curvature of field becomes noticeable on the image plane I.

For the arrangement wherein the dioptric element 13 having power is located on the image plane side I of the concentric element 12 made up of two semitransparent curved surfaces concave on the pupil plane E, it is important to conform to the following condition (7):

$$-0.4 < f_2/f_3 < 0.2 \qquad (7)$$

Here $f_3$ is the focal length of the dioptric element 13 having power, which is located on the image plane side I, and $f_2$ is the focal length of the concentric element 12.

When the value of the above condition (7) exceeds the upper limit of 0.2, negative curvature of field produced at the concentric element 12 is undercorrected by the dioptric element 13; so the negative curvature of field becomes noticeable on the image plane I. When the value of the above condition (7) is below the lower limit of −0.4, on the contrary, positive curvature of field produced at the concentric element 12 is undercorrected by the dioptric element 13; so the positive curvature of field becomes noticeable on the image plane I.

More preferably, and to obtain an image of higher resolution at a wider field angle, it is desired that dioptric elements conforming to the following conditions (8) and (9) be located on both the pupil position and image plane side of the optical system.

More preferably, and to obtain an image of higher resolution at a wider field angle, it is desired that dioptric elements conforming to the following conditions (8) and (9) be located both the pupil and image plane sides of the concentric element.

When a dioptric element having power is located on the pupil plane side, there is a fear that the field angle of a beam of off-axis rays incident on the concentric element made up of semitransparent curved surfaces becomes large at a field angle larger than 120°. This is true of even when the field angle of the beam of off-axis rays is reduced with the positive power of the dioptric element. When a dioptric element having power is located on the image plane side, too, there is a fear that if the field angle of a beam of incident off-axis rays is very large, it is then difficult to obtain an image of high resolution by offsetting off-axis aberrations produced at the concentric element by the dioptric element.

To achieve an optical system having a wider field angle while off-axis aberrations are well corrected, it is therefore desired that dioptric elements 11 and 13 having power be located on both pupil and image plane sides E and I of a concentric element 12, as shown in FIG. 3. Here, reference numeral 111 represents the pupil-side refracting surface of the dioptric element 11 located on the pupil plane side E, 121 the semitransparent curved surface of the concentric element 12 located on the pupil plane side E, 122 the semitransparent curved surface of the concentric element 12 located on the image plane side I, and 132 the image-side refracting surface of the dioptric element 13 located on the image plane side I.

In the arrangement wherein the dioptric elements 11 and 13 are located on the pupil and image plane sides E and I of the concentric element 12, aberrations hardly occur upon a beam of off-axis rays passing through the surfaces 121 and 122 of cemented contact of the dioptric elements 11 and 13 with the concentric element 12, if there is a little difference in the index of refraction between the vitreous materials forming the dioptric elements 11 and 13 and the concentric element 12. In other words, it is only upon refraction at the surfaces 121 and 122 where aberrations are chiefly produced at the concentric element 12. By placing the powers of the two semitransparent curved surfaces 121 and 122 in a well-balanced state, off-axis aberrations can be corrected by the concentric element 12 alone, because curvature of field and coma produced upon refraction at the surfaces 121 and 122 are offset each other.

It is then important to balance the powers of dioptric elements 11 and 13 against that of the concentric element 12. In other words, it is important to conform to the following conditions (8) and (9):

$$0 < f_2/f_1 < 1.0 \qquad (8)$$

$$-1.2 < f_2/f_3 < 0 \qquad (9)$$

Here, $f_1$ is the focal length of the dioptric element 11 having power, which is located on the pupil plane side E, $f_3$ is the focal length of the dioptric element 13 having power, which is located on the image plane side I, and $f_2$ is the focal length of the concentric element 12.

When the values of the above conditions (8) and (9) exceed the respective upper limits of 1.0 and 0, negative curvature of field produced at the concentric element 12 made up of the two semitransparent curved surfaces 121 and 122 is undercorrected by the dioptric elements 11 and 13; so the negative curvature of field becomes noticeable on the image plane I. When the values of the above conditions (8) and (9) are below the respective lower limits of 0 and −1.2, on the contrary, positive curvature of field produced at the concentric element 12 is undercorrected by the dioptric elements 11 and 13; so the positive curvature of field becomes noticeable on the image plane I.

As above mentioned, the dioptric elements 11 and 13 play a role in enabling aberrations to be corrected by the concentric element 12 alone. To achieve this, it is more important to prevent the occurrence of off-axis aberrations upon a beam of off-axis rays entering the dioptric element 11 and upon a beam of off-axis rays leaving the dioptric element 13. To this end, it is required to take the shape of the located dioptric elements 11 and 13 into consideration. In other words, it is important for the dioptric element 11 located on the pupil plane side E to have a shape close to a plano-convex shape, and for the dioptric element 13 located on the image plane side I to have a shape close to a concavo-planar shape. By allowing the surface 111 to have a shape close to a planar shape, the field angle of a beam of off-axis rays can be extremely reduced with no substantial occurrence of off-axis aberrations at the surface 111. By allowing the surface 132 to have a shape close to a planar shape, it is possible to extremely reduce the angle of incidence of an off-axis chief ray on the surface 132, said chief ray propagating nearly along the optical axis to the image plane I, so that the occurrence of off-axis aberrations at the surface 132 can be substantially eliminated.

Even when the dioptric elements 11 and 13 are brought in no cemented contact with the concentric element 12, the actions as above mentioned are again achievable, if the radii of curvature of the surfaces of the dioptric elements 11 and 13 to face the concentric element 12 are almost identical with those of the surfaces 121 and 122 with reduced air separations between the dioptric elements 11, 13 and the concentric element 12. The reason is that off-axis aberrations are offset each other by the image-side surface of the dioptric element 11 and the surface 121, and the pupil-side surface of the dioptric element 13 and the surface 122.

It is noted that the transmission-to-reflection ratio of the semitransparent surfaces used herein may lie in the range of 2:8 to 8:2.

Such division of the quantity of light may be achieved by dividing the quantity of light in terms of area (area division method) and/or dividing the intensity of light (intensity division method), or dividing the quantity of light depending on the angle of incidence (the critical angle for total reflection).

The above area division method will now be explained with reference to FIG. 5. As illustrated in FIG. 5, an aluminum coating 42 is provided on a transparent substrate 41 formed of glass, plastics or the like. This aluminum coating 42 is provided in a mesh form of a few μm to about 0.1 mm, so that the overall (macroscopic) reflectance and transmittance can be determined by the ratio between an area which reflects light and an area which does not reflect but transmits light.

One means or method for dividing the quantity of light into the quantity of transmitted light and the quantity of reflected light will then be explained with reference to FIG. 6. This means is achievable relatively easily as well as inexpensively. As illustrated in FIG. 6, a semitransparent thin film 43 is coated on a transparent substrate 41 formed of glass, plastics or the like for the purpose of dividing the quantity of light. Generally, thin films of metals such as Al (aluminum), and Cr (chromium) may be used for the semitransparent thin film 43. Alternatively, laminated thin films of $SiO_2$, $MgF_2$, etc., may be used in the form of a dielectric multilayer film.

Another means or method for making use of polarization to divide the quantity of light into the quantity of transmitted light and the quantity of reflected light will now be explained with reference to FIG. 7. As illustrated in FIG. 7, a polarizing semitransparent thin film 44 is coated on a transparent substrate 41 formed of glass, plastics or the like for selective transmission or reflection of p polarized light and S polarized light in a divided manner, so that reflectance and transmittance can be determined by the ratio of P polarized light and S polarized light in the incident light.

The above-mentioned methods may be used in combination with one another, if desired.

Use may also be made of means for dividing the quantity of light into the quantity of transmitted light and the quantity of reflected light by a holographic element.

As an alternative to the above-mentioned easy-to-perform method comprising the coating of a thin film, use may be made of a method for dividing the incident light into reflected light and transmitted light by the angle of incidence of light (the critical angle for total reflection). According to this method typically illustrated in FIG. 8(a), light from the image plane I of a liquid crystal display element (LCD) undergoes total reflection at a first surface 121 of an ocular system 12 and reflection at a second surface 122 (which may be either a mirror or a semitransparent surface), and strikes again on the first surface 121. In this case, any decrease in the quantity of light occurring at the first surface 121 can be prevented in the process of guiding a transmitted image to the eye E of a viewer. A problem associated with the above-mentioned light division means using thin films, etc., is that the quantity of light decreases whenever it is divided. In contrast, the use of total reflection enables rays $S_1$ and $S_2$ whose angles of incidence are larger than the critical angle for total reflection (θ) to undergo total reflection at the first surface 121 and a ray T whose angle of incidence is smaller than the critical angle of total reflection (θ) to transmit through the first surface 121, as can be seen from FIG. 8(b). It is then desired that the first and second surfaces 121 and 122 be such that the first angle of incidence of light on the first surface 121 of FIG. 8(a) becomes larger than the critical angle for total reflection (θ) and the second angle of incidence of light on the first surface 121 after reflection at the second surface 122 becomes smaller than the critical angle for total reflection (θ), thereby reducing quantitative losses.

To cut off flare light transmitted through the first and second surfaces 121 and 122 of the concentric element 12 directly to the image plane I without reflection at those surfaces whatsoever, it is important that polarizing elements making use of polarized light as disclosed in Reissued U.S. Pat. No. 27356 are located. For instance, a first polarizing plate and a quarter-wave plate are located on the pupil plane side E of the first surface 121 to convert the incident light into circularly polarized light. Then, another quarter-wave plate is located between the first surface 121 and the semitransparent surface of the second surface 122, and a second polarizing plate with the polarizing surface having a parallel Nicols relation to the first polarizing plate is located after the semitransparent surface of the second surface 122. In the arrangement including such polarizing elements, a normal ray undergoing reflection at the first and second surfaces 121 and 122 once for each passes three times through the quarter-wave plate located between the first and second surfaces 121 and 122; so the normal ray passes four times in all through the quarter-wave plate. Accordingly, the plane of polarization of the light passing through the first polarizing plate does not rotate, and passes through the second polarizing plate having a parallel Nicols relation to the first polarizing plate. However, the ray passing through the semitransparent surface of the first surface 121 without undergoing reflection thereat passes merely through the quarter-wave plate twice in all, so that it can be cut off by the second polarizing plate with the plane of polarization rotated through 90°.

By use of the polarizing elements, it is thus possible to cut off flare light. The above arrangement is referred to for the purpose of illustration alone; so other arrangements of polarizing elements may be used.

If two sets of such optical systems are used in the form of an ocular system, it is then unnecessary for a viewer to view an image with one eye closed. For a viewer, it is possible to view an image with both eyes in a comfortable manner. By presenting a parallactic image to both eyes, it is also possible to view the image in the form of a stereo-graphic image. Moreover, the use of two sets of the optical systems according to the present invention together with a support mechanism for supporting them on the head of a viewer enables an image to be viewed in a comfortable position.

A portable type of visual display unit, for instance, a fixed or head mount type of image display unit that enables an image to be viewed with both eyes may be constructed by providing a pair of visual display sets, each comprising an ocular system defined by the optical system according to the present invention and a two-dimensional image display device, and supporting the visual display sets while they are spaced away from each other by an eye-to-eye distance. One general construction of such a portable type of image display unit is shown in FIG. 9. A display unit body 50 includes a pair of ocular systems, each made up of such an optical system as above mentioned. Associated with these systems, a two-dimensional image display unit made up of liquid crystal display devices is located on the image plane, although not illustrated. Continuously extending from both sides of the body 50 are temple frames 51, as shown, which are in turn joined to each other by means of a parietal frame 52. Both temple frames 51 include rear frames 54 connected thereto through leaf springs 53, which are engaged with the rear portions of the ears of a viewer, like the bows of spectacles, while the parietal frame 52 is placed over the parietal of the viewer, so that the body 50 can be held just before the viewer's eyes. Since a parietal pad 55 formed of an elastomer such as a sponge is provided to the inside of the parietal frame 52 and similar pads are provided to the insides of the rear frames 54, this display unit can be mounted over the viewer's head in a comfortable manner.

Speakers 56 additionally provided to the rear frames 54 enable the viewer to listen to stereophonic sound while viewing images. As illustrated, a playback device 58 such as a portable video camera is connected through an image/sound transmitting cord 57 to the display unit body 50 including speakers 56. Thus, if the playback device 58 is held at any desired position of a belt or the like, as shown, the viewer will then be able to enjoy images and sound at the same time. In FIG. 9, reference numeral 59 represents a control panel for a switch of the playback device 58, volume, etc. It is here noted that electronic parts such as image and sound processing circuits are built in the parietal frame 52.

The cord 57, if it has a jack at its distal end, may be connected to an existing video deck, etc. If the cord 57 is connected to a tuner for receiving TV electric waves, the viewer will then be able to watch television. If the cord 57 is connected to a computer, the viewer will then be able to look at computer graphics images or message images from the computer. For removal of needless cord portions, external signals may be received by electric waves via an antenna.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
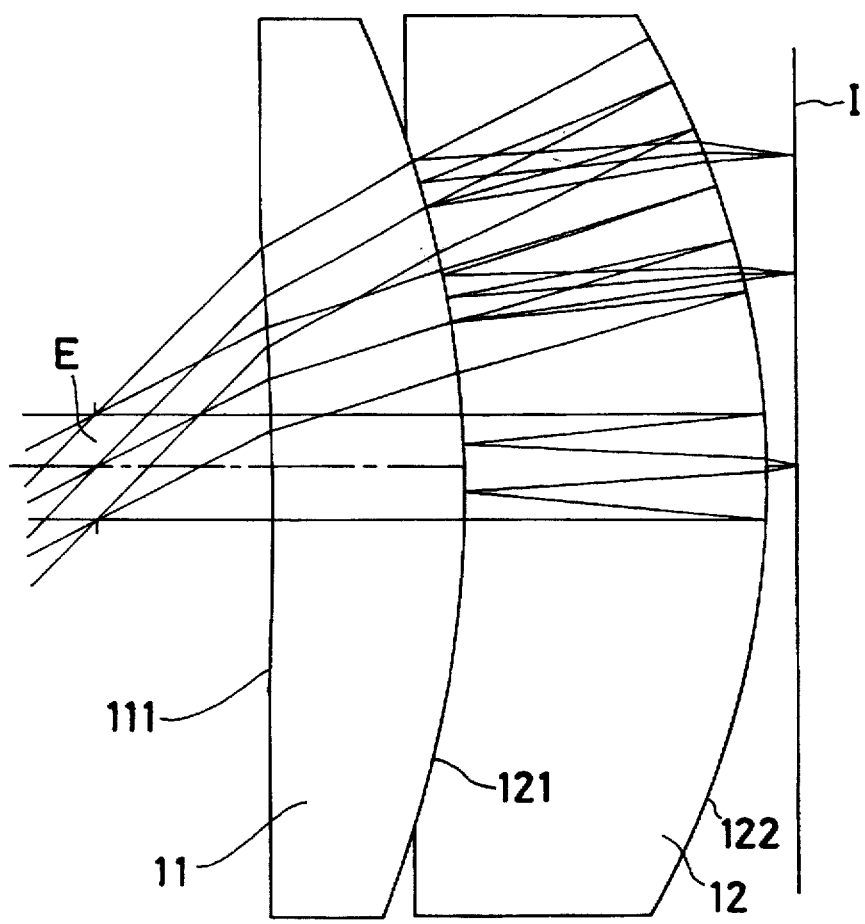
FIG. 1 is an optical path diagram showing an optical system of the present invention wherein a dioptric element is cemented to the pupil side of an optical element having such curvature that the convex surface lies in a substantially identical direction.
Figure 2:
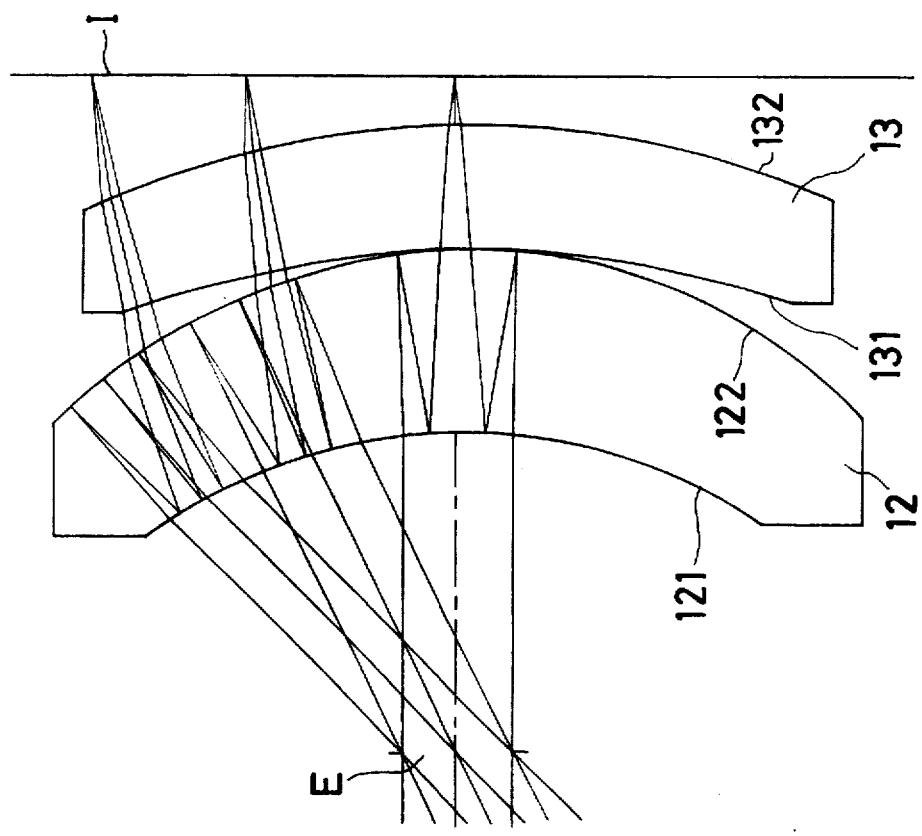
FIG. 2 is an optical path diagram showing an optical system of the present invention wherein a dioptric element is located on the image plane side of an optical element having such curvature that the convex surface lies in a substantially identical direction.
Figure 3:
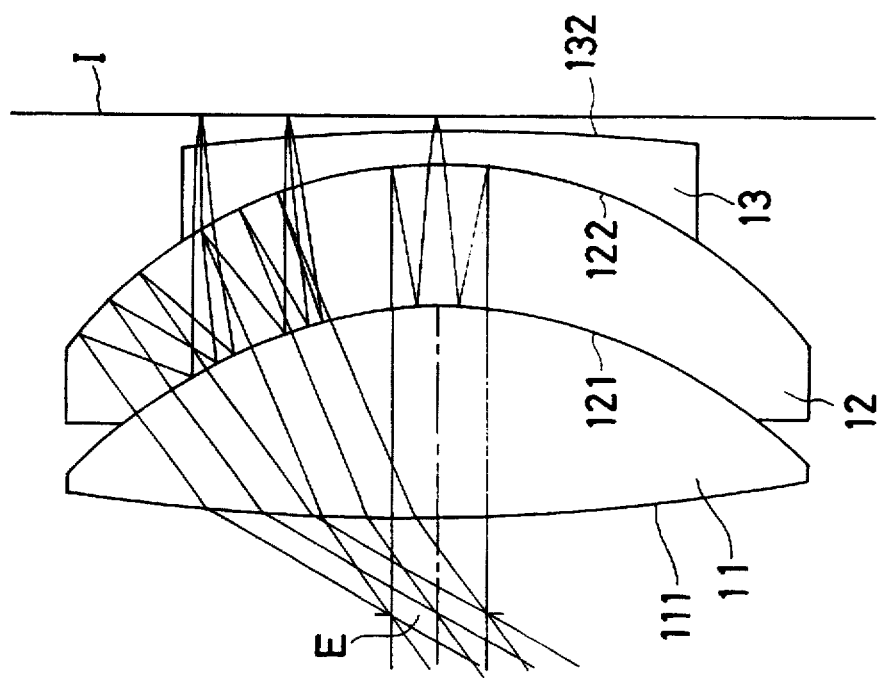
FIG. 3 is an optical path diagram showing an optical system of the present invention wherein dioptric elements are located on both sides of an optical element having such curvature that the convex surface lies in a substantially identical direction.
Figure 4:
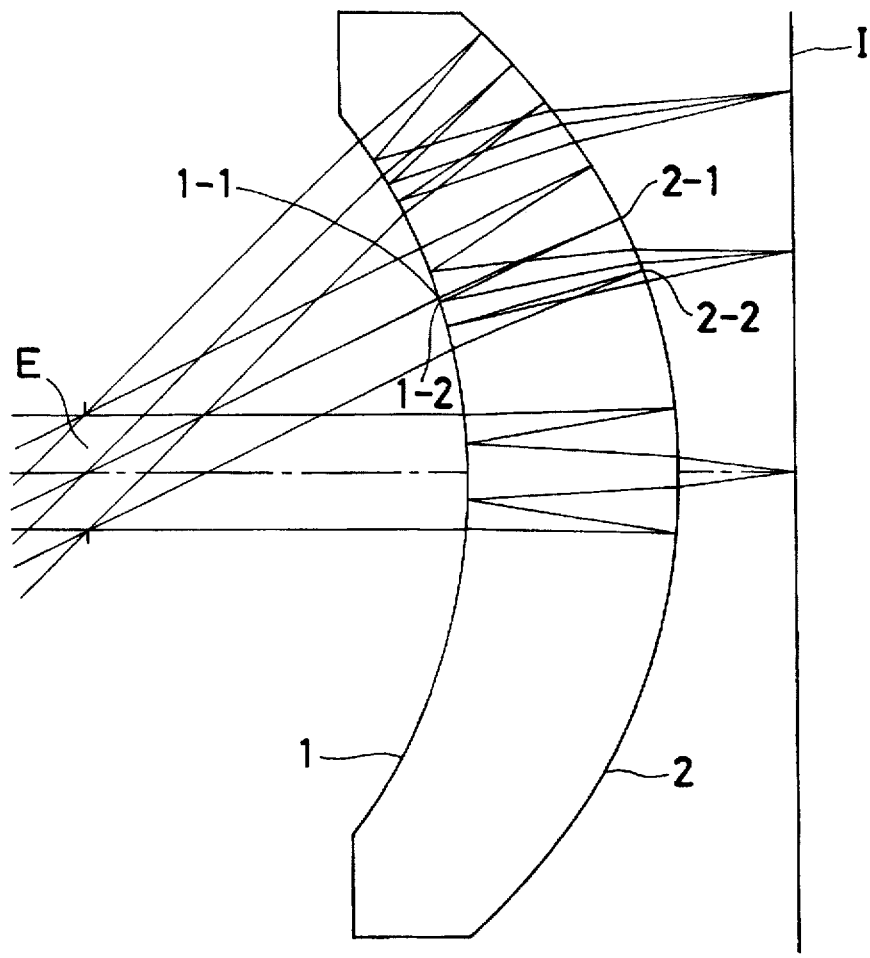
FIG. 4 is an optical path diagram for illustrating why off-axis aberrations occur in the prior optical system having such curvature that the convex surface lies in a substantially identical direction.
Figure 5:
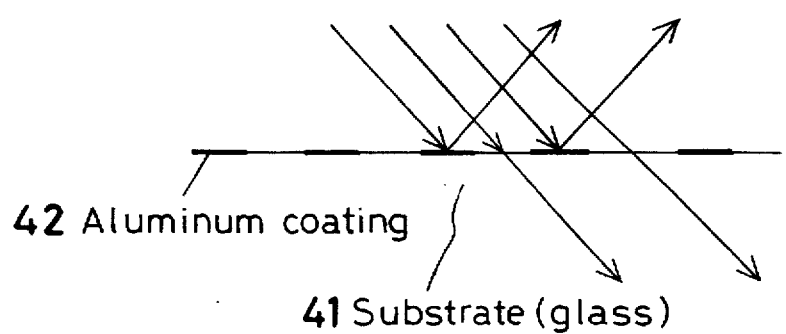
FIG. 5 is a schematic illustrating the principle of means which is applicable to a semitransparent surface to divide the quantity of light in terms of area.
Figure 6:
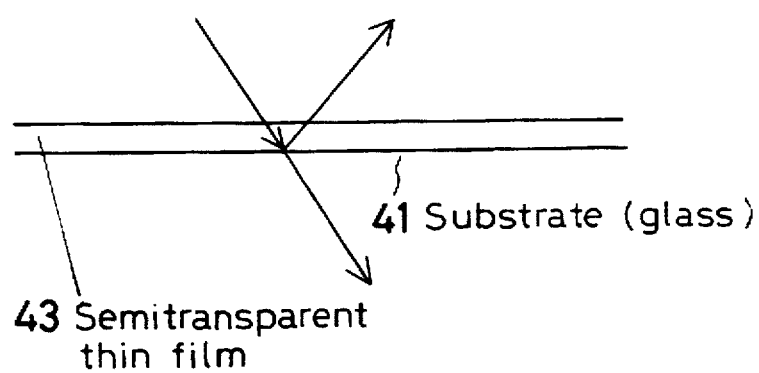
FIG. 6 is a schematic illustrating the principle of means which is applicable to a semitransparent surface to divide the quantity of light quantitatively.
Figure 7:
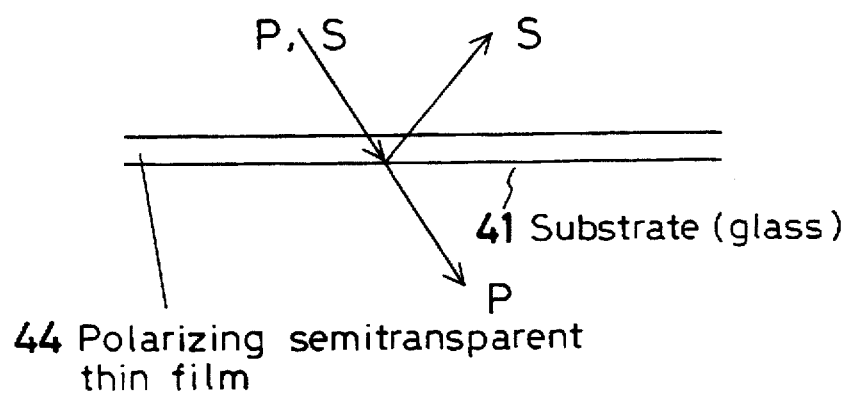
FIG. 7 is a schematic illustrating the principle of means which is applicable to a semitransparent surface to divide the quantity of light by polarization.
Figure 8A:
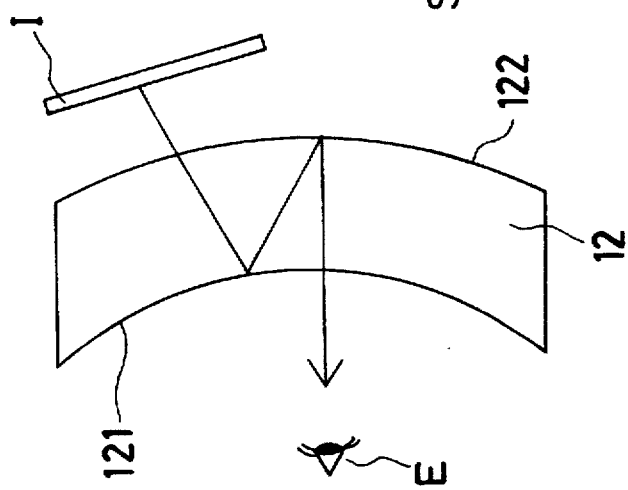
FIGS. 8(a) and 8(b) are schematics illustrating means for dividing the quantity of light into the quantity of reflected light and the quantity of transmitted by the angle of incidence of light.
Figure 8B:
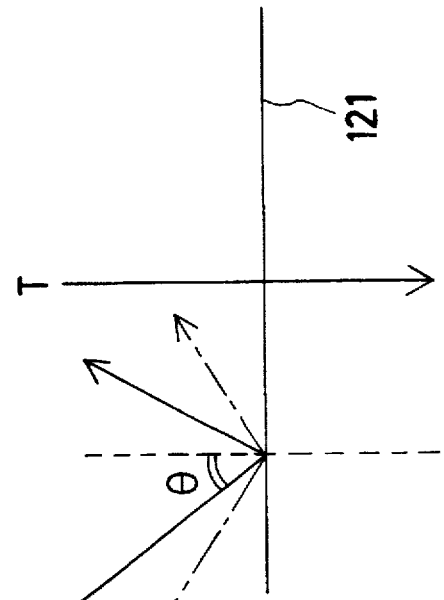
Figure 9:
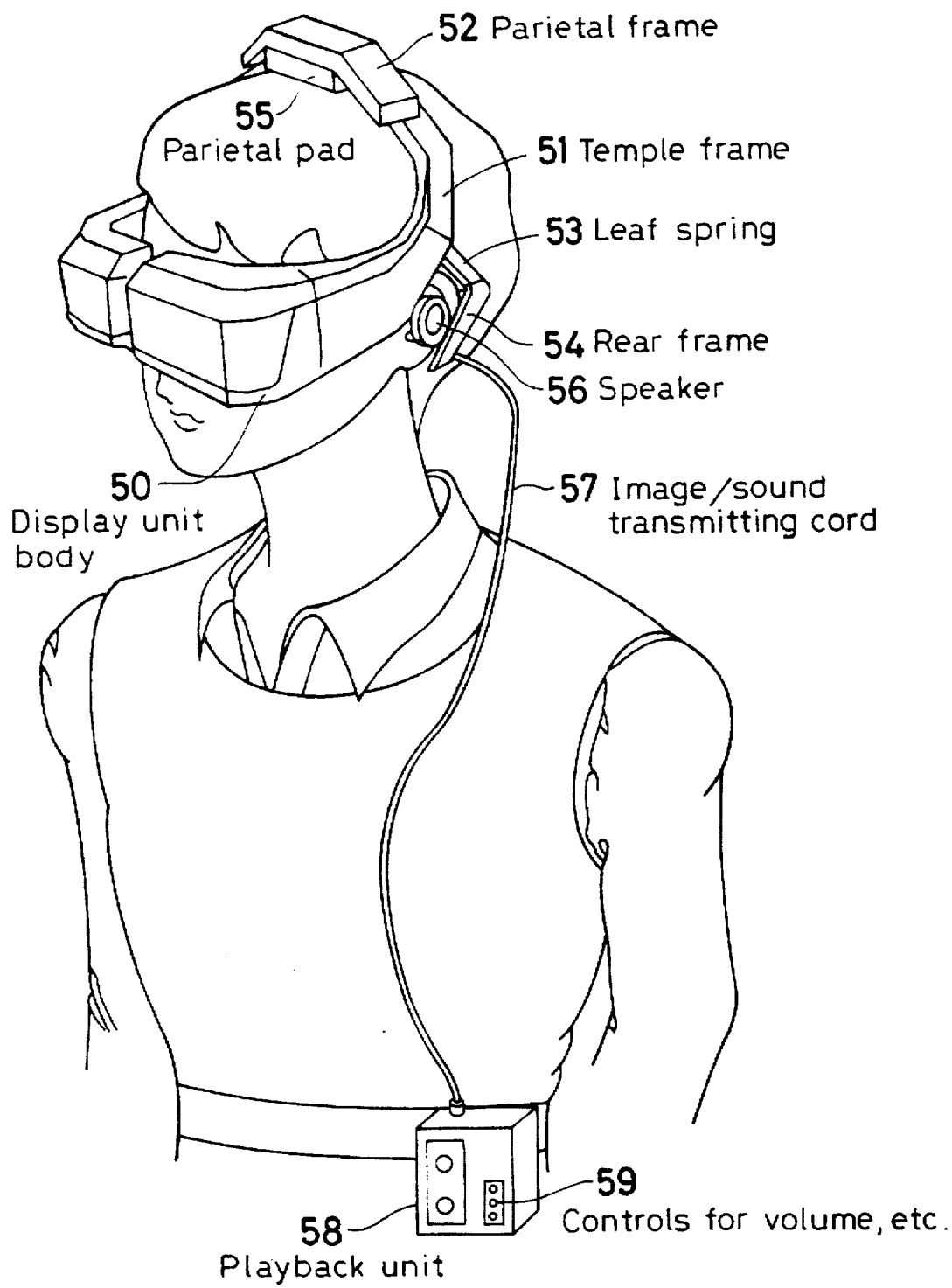
FIG. 9 a view showing the general construction of one embodiment of a portable type of visual display unit.

Reference will now be made to Examples 1–9 of the optical system according to the present invention.

FIGS. 10 to 18 are sectional views of Examples 1 to 9 of the optical system according to the present invention. Numerical data about each example will be given later. In FIGS. 10 to 18, letters E and I represent the pupil position and the image plane, respectively, and reference numeral 12 represents a concentric element made up of a first semitransparent surface 121 and a second semitransparent surface 122, 11 a dioptric element having power, which is located on the pupil plane side of the concentric element 12, and 13 a dioptric element having power, which is located on the image plane side of the concentric element 12.

Figure 10:
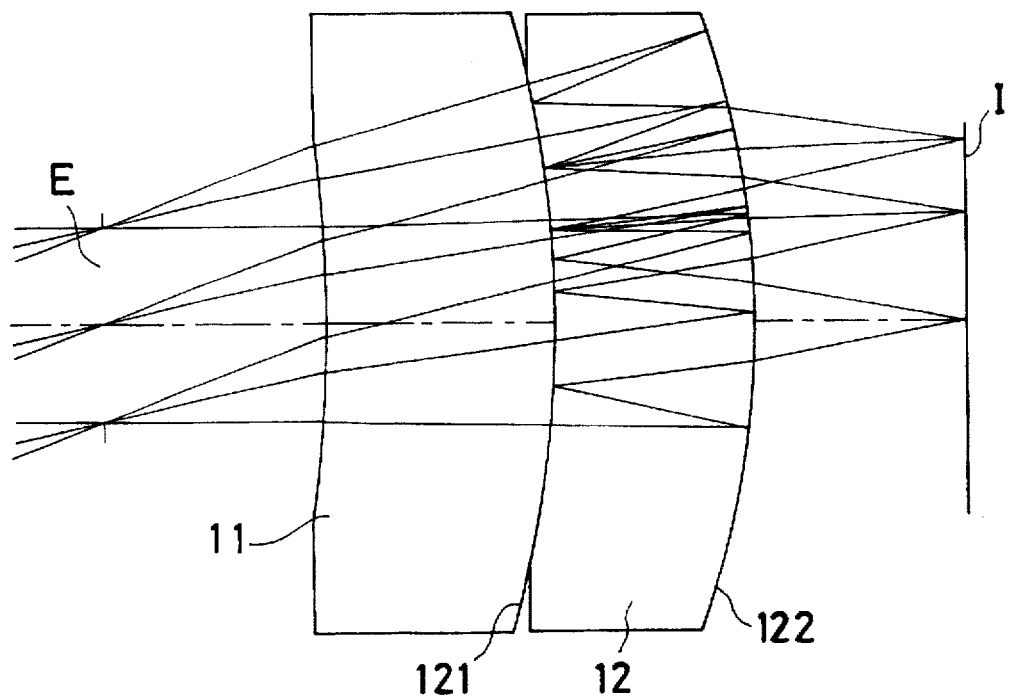
FIG. 10 is a sectional view of the optical system according to Example 1 of the present invention.

In Example 1, the first and second semitransparent surfaces 121 and 122 are concave surfaces convex on the image plane side I and a positive meniscus lens 11 convex on the image plane side I is cemented to the pupil plane side E of the concentric element 12, as shown in FIG. 10. In this example, the field angle, pupil diameter, focal length and F-number are 40°, 15 mm, 40 mm and 2.7, respectively. The value of $f_2/f_1$ in Cond. (6) is 0.208.

It is here noted that in the numerical data given later, the surfaces are numbered in the order that rays pass through them, nd is the d-line refractive index of a transparent body, and νd is the Abbe's number thereof.

Figure 11:
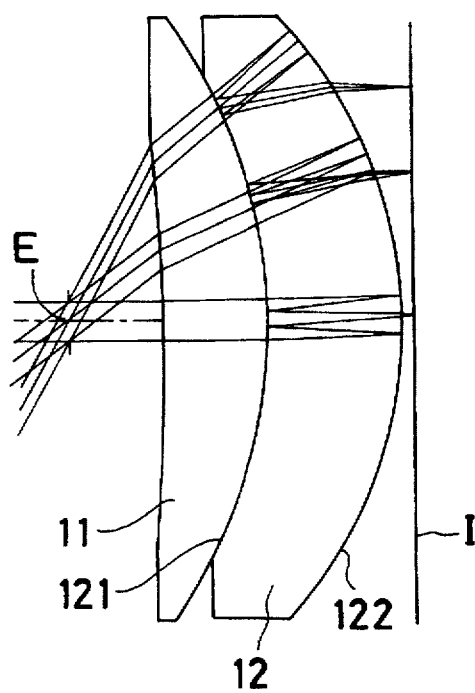
FIG. 11 is a sectional view of the optical system according to Example 2 of the present invention.

In Example 2, the first and second semitransparent surfaces 121 and 122 are concave surfaces convex on the image plane side I and a positive meniscus lens 11 convex on the image plane side I is cemented to the pupil plane side E of the concentric element 12, as shown in FIG. 11. In this example, the field angle, pupil diameter, focal length and F-number are 120°, 6 mm, 40 mm and 6.7, respectively. The value of $f_2/f_1$ in Cond. (6) is 0.039.

Figure 12:
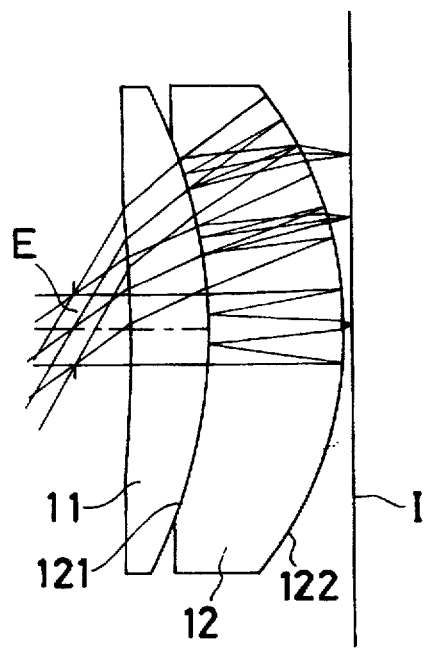
FIG. 12 is a sectional view of the optical system according to Example 3 of the present invention.

In Example 3, the first and second semitransparent surfaces 121 and 122 are concave surfaces convex on the image plane side I and a positive meniscus lens 11 convex on the image plane side I is cemented to the pupil plane side E of the concentric element 12, as shown in FIG. 12. In this example, the field angle, pupil diameter, focal length and F-number are 120°, 15 mm, 40 mm and 2.7, respectively. The value of $f_2/f_1$ in Cond. (6) is 0.146.

Figure 13:
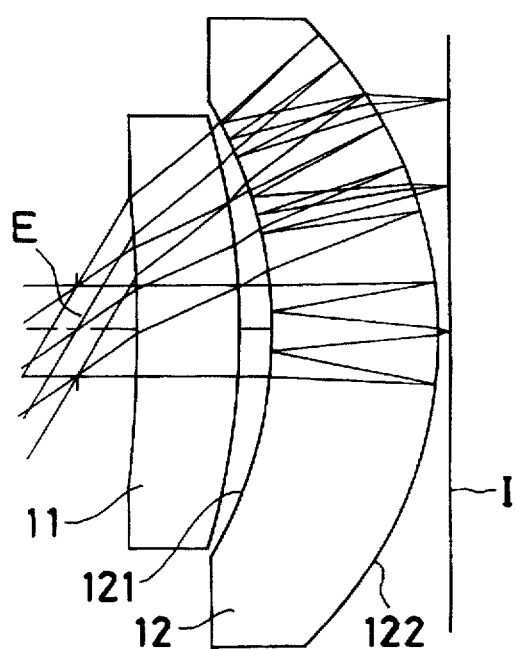
FIG. 13 is a sectional view of the optical system according to Example 4 of the present invention.

In Example 4, the first and second semitransparent surfaces 121 and 122 are concave surfaces convex on the image plane side I and a positive meniscus lens 11 convex on the image plane side I is spaced away from the pupil plane side E of the concentric element 12, as shown in FIG. 13. In this example, the field angle, pupil diameter, focal length and F-number are 120°, 15 mm, 40 mm and 2.7, respectively. The value of $f_2/f_1$ in Cond. (6) is 0.082.

Figure 14:
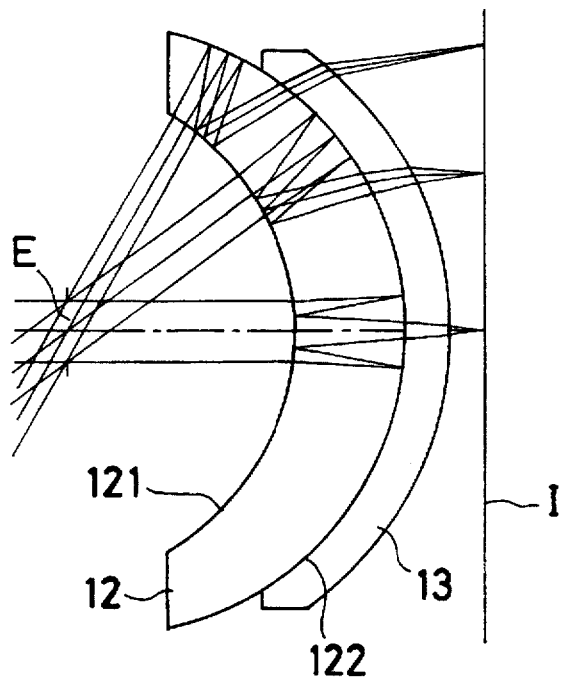
FIG. 14 is a sectional view of the optical system according to Example 5 of the present invention.

In Example 5, the first and second semitransparent surfaces 121 and 122 are concave surfaces convex on the image plane side I and a negative meniscus lens 13 convex on the image plane side I is cemented to the image plane side I of the concentric element 12, as shown in FIG. 14. In this example, the field angle, pupil diameter, focal length and F-number are 120°, 10 mm, 40 mm and 4.0, respectively. The value of $f_2/f_3$ in Cond. (7) is −0.031.

Figure 15:
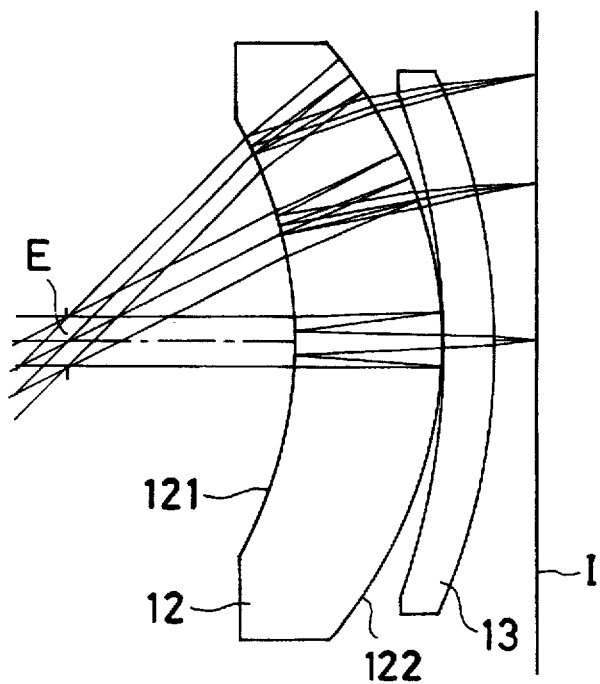
FIG. 15 is a sectional view of the optical system according to Example 6 of the present invention.

In Example 6, the first and second semitransparent surfaces 121 and 122 are concave surfaces convex on the image plane side I and a positive meniscus lens 13 convex on the image plane side I is spaced away from the image plane side I of the concentric element 12, as shown in FIG. 15. In this example, the field angle, pupil diameter, focal length and F-number are 90°, 6 mm, 40 mm and 6.7, respectively. The value of $f_2/f_3$ in Cond. (7) is 0.037.

Figure 16:
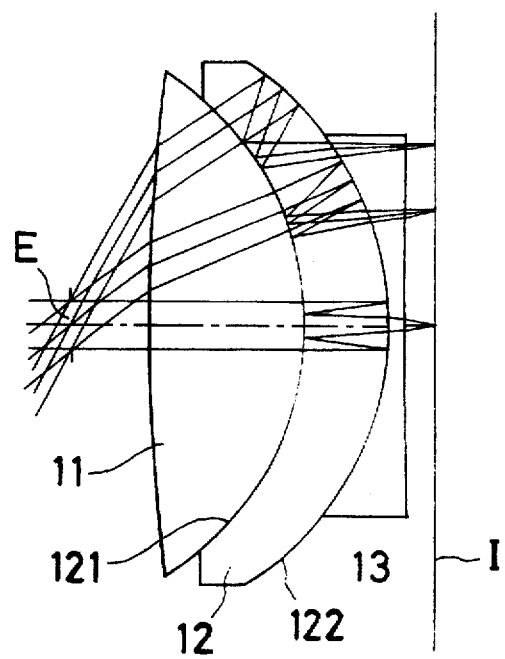
FIG. 16 is a sectional view of the optical system according to Example 7 of the present invention.

In Example 7, the first and second semitransparent surfaces 121 and 122 are concave surfaces convex on the image plane side I, and a double-convex lens 11 is cemented to the pupil plane side E of the concentric optical element 12 while a negative meniscus lens 13 convex on the image plane side I is cemented to the image plane side I of the concentric element 12, as shown in FIG. 16. In this example, the field angle, pupil diameter, focal length and F-number are 120°, 10 mm, 40 mm and 4.0, respectively. The value of $f_2/f_1$ in Cond. (8) is 0.440, and the value of $f_2/f_3$ in Cond. (9) is −0.577.

Figure 17:
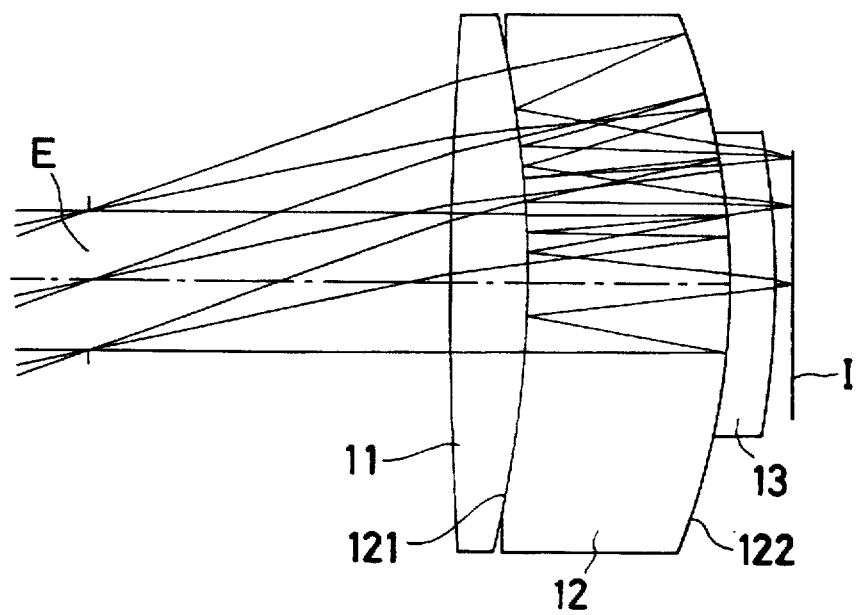
FIG. 17 is a sectional view of the optical system according to Example 8 of the present invention.

In Example 8, the first and second semitransparent surfaces 121 and 122 are concave surfaces convex on the image plane side I, and a double-convex lens 11 is cemented to the pupil side E of the concentric element 12 while a negative meniscus lens 13 convex on the image plane side I is cemented to the image plane side I of the concentric element 12, as shown in FIG. 17. In this example, the field angle, pupil diameter, focal length and F-number are 40°, 15 mm, 40 mm and 2.7, respectively. The value of $f_2/f_1$ in Cond. (8) is 0.174, and the value of $f_2/f_3$ in Cond. (9) is −0.029.

Figure 18:
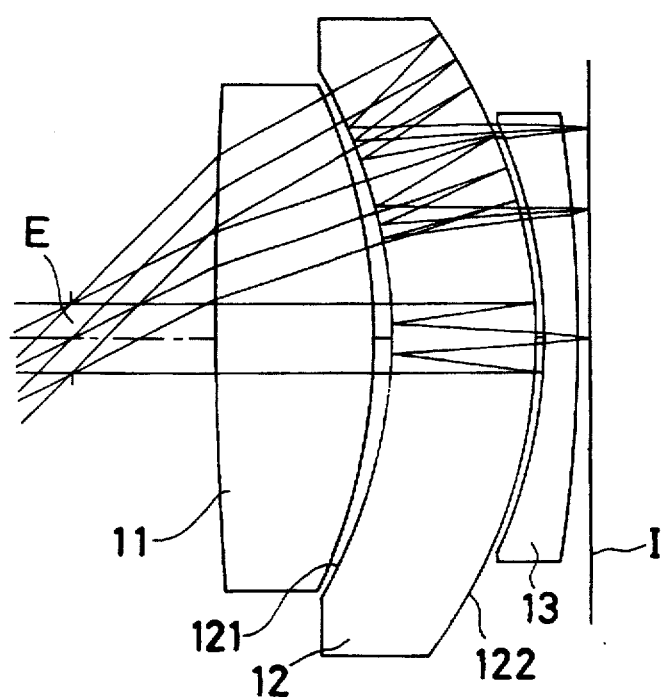
FIG. 18 is a sectional view of the optical system according to Example 9 of the present invention.

In Example 9, the first and second semitransparent surfaces 121 and 122 are concave surfaces convex on the image plane side I, and a double-convex lens 11 is spaced slightly away from the pupil plane side E of the concentric element 12 while a negative meniscus lens 13 convex on the image plane side I is spaced slightly away from the image plane side I of the concentric element 12, as shown in FIG. 18. In this example, the field angle, pupil diameter, focal length and F-number are 90°, 10 mm, 40 mm and 4.0, respectively. The value of $f_2/f_1$ in Cond. (8) is 0.297, and the value of $f_2/f_3$ in Cond. (9) is −0.312.

Set out below are the numerical data about Examples 1 to 9.

EXAMPLE 1

| Surface No. | Radius of curvature | Surface separation | Refractive index | Abbe's No. |
|---|---|---|---|---|
| 1 | (pupil position E) | 17.785 | | |
| 2 | −104.0275 | 18.000 | 1.4870 | 70.4 |
| 3 | −92.3647 | 16.000 | 1.4880 | 69.7 |

-continued

| Surface No. | Radius of curvature | Surface separation | Refractive index | Abbe's No. |
|---|---|---|---|---|
| 4 | −69.1938 (reflective surface 122) | −16.000 | 1.4880 | 69.7 |
| 5 | −92.3647 (reflective surface 121) | 16.000 | 1.4880 | 69.7 |
| 6 | −69.1938 | 16.308 | | |
| 7 | (image plane I) | | | |

EXAMPLE 2

| Surface No. | Radius of curvature | Surface separation | Refractive index | Abbe's No. |
|---|---|---|---|---|
| 1 | (pupil position E) | 16.543 | | |
| 2 | −422.9719 | 18.000 | 1.4870 | 70.4 |
| 3 | −89.7455 | 22.939 | 1.4870 | 70.4 |
| 4 | −76.5015 (reflective surface 122) | −22.939 | 1.4870 | 70.4 |
| 5 | −89.7455 (reflective surface 121) | 22.939 | 1.4870 | 70.4 |
| 6 | −76.5015 | 2.000 | | |
| 7 | (image plane I) | | | |

EXAMPLE 3

| Surface No. | Radius of curvature | Surface separation | Refractive index | Abbe's No. |
|---|---|---|---|---|
| 1 | (pupil position E) | 12.588 | | |
| 2 | −329.5184 | 18.000 | 1.4870 | 70.4 |
| 3 | −105.1892 | 28.327 | 1.7550 | 27.6 |
| 4 | −87.3558 (reflective surface 122) | −28.327 | 1.7550 | 27.6 |
| 5 | −105.1892 (reflective surface 121) | 28.327 | 1.7550 | 27.6 |
| 6 | −87.3558 | 2.000 | | |
| 7 | (image plane I) | | | |

EXAMPLE 4

| Surface No. | Radius of curvature | Surface separation | Refractive index | Abbe's No. |
|---|---|---|---|---|
| 1 | (pupil position E) | 10.060 | | |
| 2 | −248.9365 | 18.000 | 1.4870 | 70.4 |
| 3 | −129.2398 | 5.000 | | |
| 4 | −77.9293 | 27.814 | 1.7550 | 27.6 |
| 5 | −76.6712 (reflective surface 122) | −27.814 | 1.7550 | 27.6 |
| 6 | −77.9293 (reflective surface 121) | 27.814 | 1.7550 | 27.6 |
| 7 | −76.6712 | 2.000 | | |
| 8 | (image plane I) | | | |

EXAMPLE 5

| Surface No. | Radius of curvature | Surface separation | Refractive index | Abbe's No. |
|---|---|---|---|---|
| 1 | (pupil position E) | 38.768 | | |
| 2 | −41.8658 | 18.543 | 1.7550 | 27.6 |
| 3 | −50.4784 (reflective surface 122) | −18.543 | 1.7550 | 27.6 |
| 4 | −41.8658 (reflective surface 121) | 18.543 | 1.7550 | 27.6 |
| 5 | −50.4784 | 7.524 | 1.4870 | 70.5 |
| 6 | −57.9049 | 6.029 | | |
| 7 | (image plane I) | | | |

EXAMPLE 6

| Surface No. | Radius of curvature | Surface separation | Refractive index | Abbe's No. |
|---|---|---|---|---|
| 1 | (pupil position E) | 28.053 | | |
| 2 | −53.8255 | 18.051 | 1.5421 | 53.2 |
| 3 | −55.3799 (reflective surface 122) | −18.051 | 1.5421 | 53.2 |
| 4 | −53.8255 (reflective surface 121) | 18.051 | 1.5421 | 53.2 |
| 5 | −55.3799 | 0.100 | | |
| 6 | −93.2945 | 6.473 | 1.4870 | 70.4 |
| 7 | −80.7336 | 5.130 | | |
| 8 | (image plane I) | | | |

EXAMPLE 7

| Surface No. | Radius of curvature | Surface separation | Refractive index | Abbe's No. |
|---|---|---|---|---|
| 1 | (pupil position E) | 17.875 | | |
| 2 | 405.1484 | 34.590 | 1.4870 | 70.4 |
| 3 | −63.3309 | 18.359 | 1.7550 | 27.6 |
| 4 | −65.2942 (reflective surface 122) | −18.359 | 1.7550 | 27.6 |
| 5 | −63.3309 (reflective surface 121) | 18.359 | 1.7550 | 27.6 |
| 6 | −65.2942 | 4.000 | 1.7550 | 27.6 |
| 7 | −4740.8773 | 6.038 | | |
| 8 | (image plane I) | | | |

EXAMPLE 8

| Surface No. | Radius of curvature | Surface separation | Refractive index | Abbe's No. |
|---|---|---|---|---|
| 1 | (pupil position E) | 40.267 | | |
| 2 | 490.3546 | 8.513 | 1.4870 | 70.4 |
| 3 | −140.5902 | 22.000 | 1.5329 | 52.8 |
| 4 | −87.0972 (reflective surface 122) | −22.000 | 1.5329 | 52.8 |
| 5 | −140.5902 (reflective surface 121) | 22.000 | 1.5329 | 52.8 |
| 6 | −87.0972 | 5.000 | 1.7550 | 27.6 |
| 7 | −96.4051 | 2.000 | | |
| 8 | (image plane I) | | | |

EXAMPLE 9

| Surface No. | Radius of curvature | Surface separation | Refractive index | Abbe's No. |
|---|---|---|---|---|
| 1 | (pupil position E) | 21.690 | | |
| 2 | 722.9395 | 22.931 | 1.4870 | 71.2 |
| 3 | −86.1417 | 2.328 | | |
| 4 | −76.5282 | 22.042 | 1.7550 | 27.6 |
| 5 | −73.5076 | −22.042 | 1.7550 | 27.6 |

-continued

| Surface No. | Radius of curvature | Surface separation | Refractive index | Abbe's No. |
|---|---|---|---|---|
| | (reflective surface 122) | | | |
| 6 | −76.5282 | 22.042 | 1.7550 | 27.6 |
| | (reflective surface 121) | | | |
| 7 | −73.5076 | 0.742 | | |
| 8 | −74.4603 | 5.000 | 1.7550 | 27.6 |
| 9 | −218.7444 | 2.000 | | |
| 10 | (image plane I) | | | |

Referring to Examples 1–9 as above mentioned, now let $f_1$ denote the focal length of lens 11, $f_2$ the focal length of concentric system 12, $f_3$ the focal length of lens 13, $R_{O1}$ the radius of curvature of the surface of lens 11 proximate to the pupil plane E, $R_{O2}$ the radius of curvature of the surface of lens 11 proximate to the image plane I, $R_{11}$ the radius of curvature of the surface of lens 13 proximate to the pupil plane E, $R_{12}$ the radius of curvature of the surface of lens 13 proximate to the image plane I, and $R_3$ the radius of curvature of the surface of concentric system 12 proximate to the image plane I. Set out in Tables 1 and 2 are the values of $f_1$, $1/R_{O1}$, $1/R_{O2}$, $1/R_3$, $1/R_{11}$, $1/R_{12}$, $f_2$, $f_3$, $f_2/f_1$, and $f_2/f_3$.

TABLE 1

| | $f_1$ | $1/R_{O1}$ | $1/R_{O2}$ | $1/R_3$ | $1/R_{11}$ |
|---|---|---|---|---|---|
| Ex. 1 | 1123.71 | −0.0096 | −0.0108 | −0.0145 | |
| 2 | 296.74 | −0.0029 | −0.0096 | −0.0115 | |
| 3 | 309.15 | −0.0030 | −0.0095 | −0.0114 | |
| 4 | 526.01 | −0.0040 | −0.0077 | −0.0130 | |
| 5 | | | | −0.0198 | −0.0198 |
| 6 | | | | −0.0181 | −0.0107 |
| 7 | 115.25 | 0.0025 | −0.0158 | −0.0153 | −0.0153 |
| 8 | 225.36 | 0.0020 | −0.0071 | −0.0115 | −0.0115 |
| 9 | 159.53 | 0.0014 | −0.0116 | −0.0136 | −0.0134 |

TABLE 2

| | $1/R_{12}$ | $f_2$ | $f_3$ | $f_2/f_1$ | $f_2/f_3$ |
|---|---|---|---|---|---|
| Ex. 1 | | 43.62 | | 0.0388 | |
| 2 | | 45.23 | | 0.1524 | |
| 3 | | 45.00 | | 0.1456 | |
| 4 | | 43.20 | | 0.0821 | |
| 5 | −0.0173 | 37.96 | −1209.60 | | −0.0314 |
| 6 | −0.0124 | 39.30 | 1053.49 | | 0.0373 |
| 7 | −0.0002 | 50.64 | −87.72 | 0.4394 | −0.5773 |
| 8 | −0.0104 | 44.52 | −1553.93 | 0.1976 | −0.0286 |
| 9 | −0.0046 | 47.34 | −151.78 | 0.2967 | −0.3119 |

Figure 19:
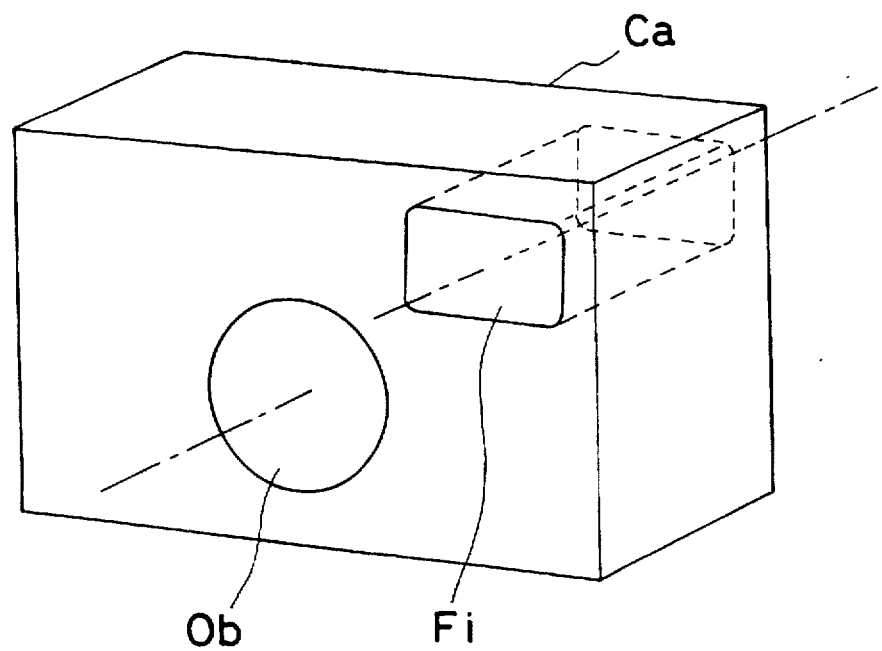
FIG. 19 is a perspective view for illustrating an embodiment of application of the optical system according to the present invention to an image-forming system of the finder system of a compact camera.
Figure 20:
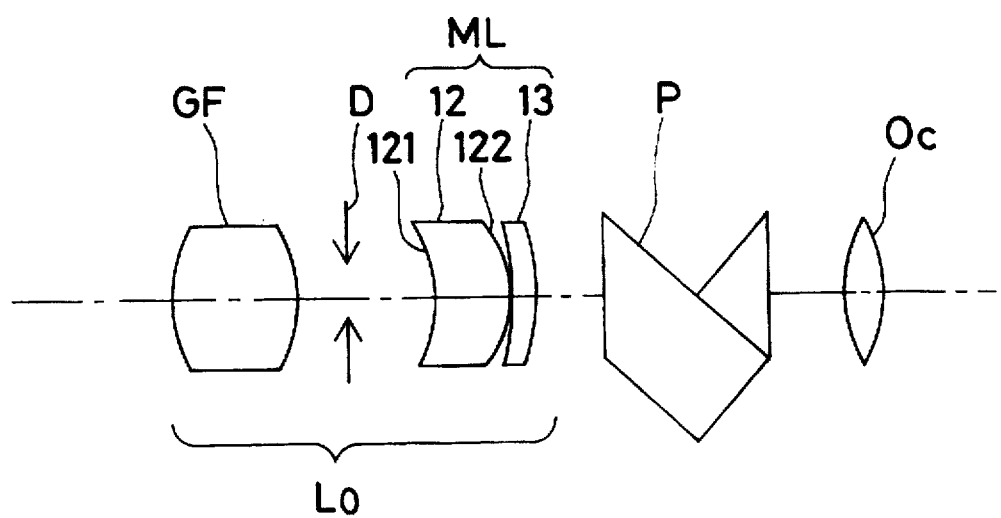
FIG. 20 is a sectional view for illustrating an embodiment wherein the optical system according to the present invention is used as part of an objective.

As already mentioned, the optical system according to the present invention may be used as an ocular or image-forming system. One example will now be explained. For the image-forming system, it is possible to use a finder system Fi of a compact camera Ca, which is substantially juxtaposed to a photographic system Ob, as typically shown in the perspective view of FIG. 19. Alternatively, an objective system Lo may be built up of a front lens group GF, an aperture diaphragm D, and an optical system ML of the present invention which is located in the rear of the diaphragm D, and is constructed from a concentric element 12 comprising a first semitransparent surface 121 and a second semitransparent surface 122 and a dioptric element 13 located in the vicinity thereof, as shown in the sectional view of FIG. 20. An image formed by this objective system Lo is erected by a Porro prism P located on the viewer side of the objective system Lo and designed to cause the image to be reflected four times, and is then viewed through an eyepiece Oc.

Furthermore, when the optical system of the present invention is used as an image-forming system, it may be constructed in the form of a front aperture system.

Figure 21A:
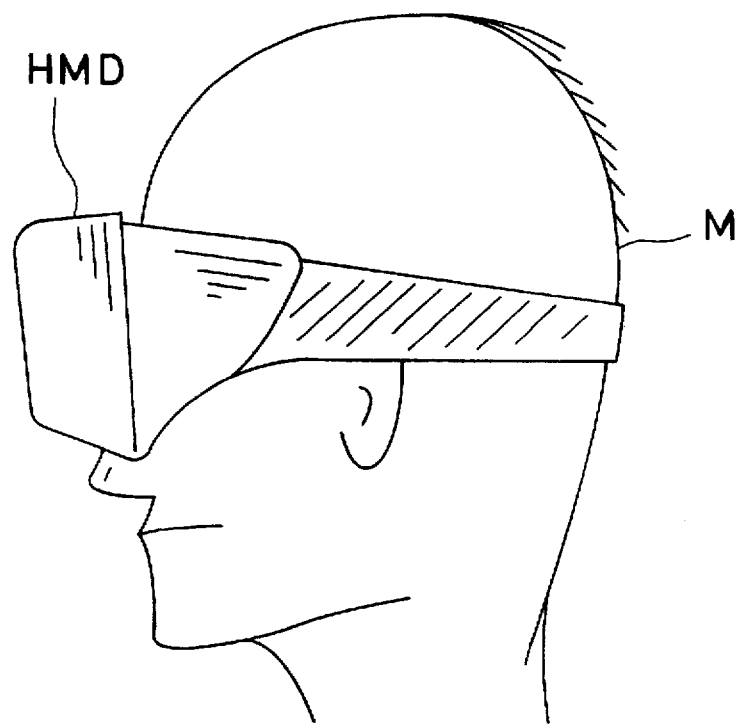
FIGS. 21(a), 21(b) and 21(c) are views for illustrating embodiments wherein an optical system according to the present invention is used as an ocular system of a head mount type of visual display unit.
Figure 21B:
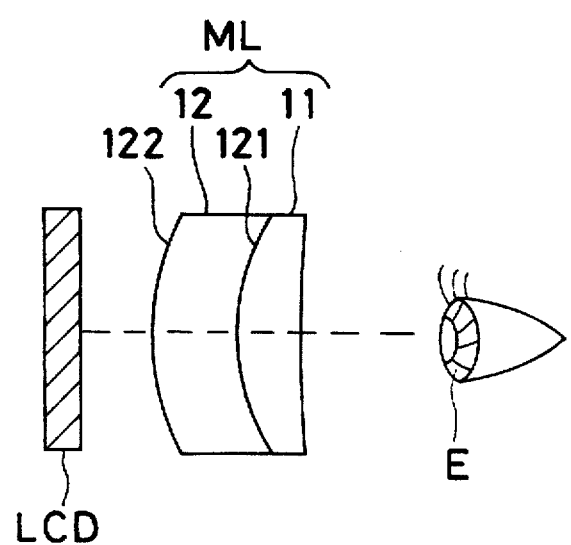
Figure 21C:
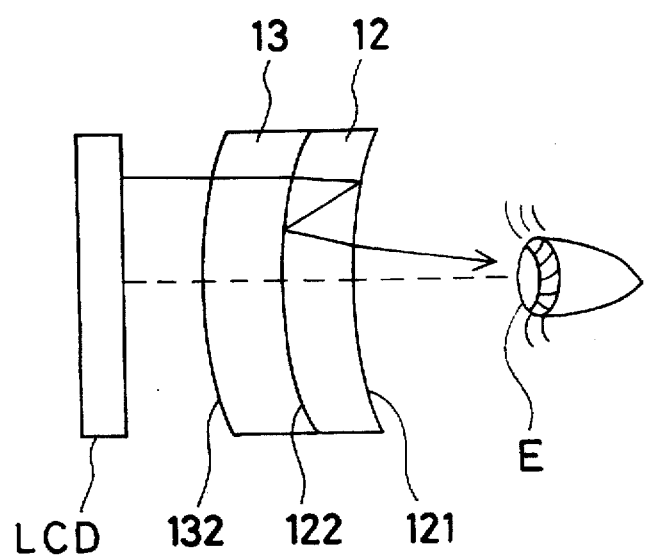
Figure 22:
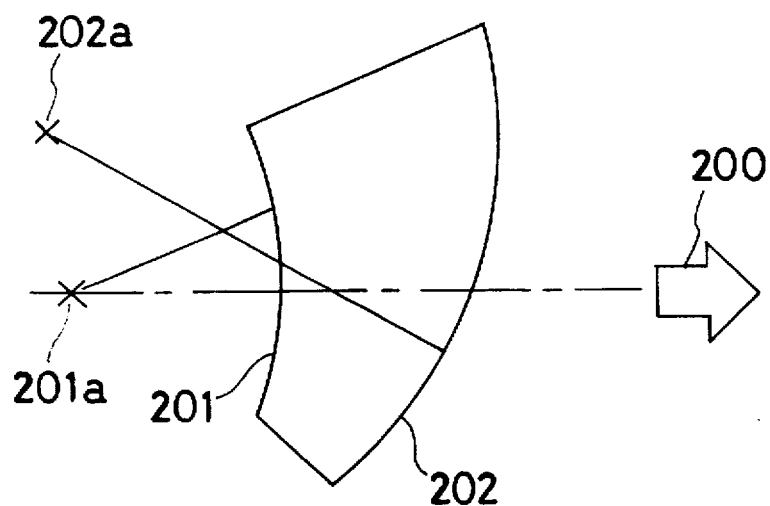
FIGS. 22(a) and 22(b) are views for illustrating optical systems to which the present invention is directed.
Figure 22:
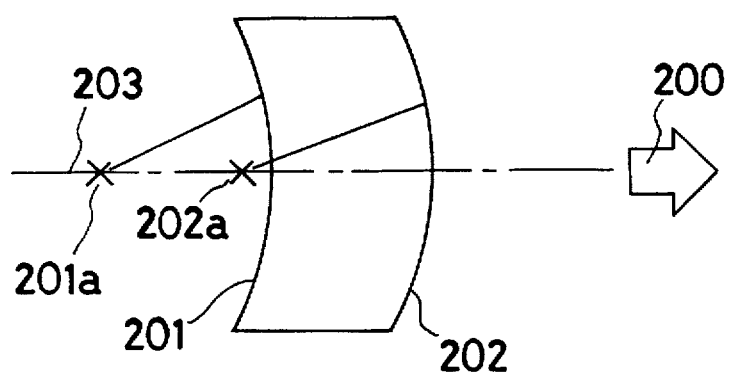

In another preferable embodiment, the optical system of the present invention is used as an ocular system for a head mount type of image display unit HMD which enables a virtual image to be magnified and projected in the eyeballs of a viewer, so that the viewer can view a virtually magnified image. This ocular system, as typically shown in the sectional view of FIG. 21(b), is built up of a liquid crystal display device LCD for displaying an image, and an optical system ML of the present invention made up of a concentric element 12 comprising a first semitransparent surface 121 and a second semitransparent surface 122 and a dioptric element 11 located in the vicinity thereof, so that the image displayed on the LCD can be magnified and projected in the eyeballs of the viewer. When the dioptric element 13 is positioned on the LCD side of the concentric element 12, the concentric and dioptric elements 12 and 13 correspond to first and second prisms, respectively, while the curved surface 121 of the concentric element 12 located on the pupil plane side E, the LCD-side curved surface 122 of the concentric element 12 and the LCD-side curved surface 132 of the dioptric element 13 correspond to first, second and third surfaces, respectively, as can be seen from the sectional view of FIG. 21(b). The light from the display device LCD is refracted and reflected at the respective surfaces, as illustrated.

As can be understood from the foregoing, the present invention can provide an optical system which is well corrected in terms of both curvature of field and coma at a field angle of about 120° and a pupil diameter of about 15 mm and may be applied to both image pickup and ocular systems. By applying this to an ocular system, it is possible to achieve a compact head mount type of image display unit which enables even a peripheral field angle region to be clearly viewed at a given wide field angle.

What we claim is:

1. A head mount type of image display unit including an image display unit body having an image display device for displaying an image and an ocular system for guiding an image displayed on said image display device to the eyeballs of a viewer, and a support member mounted over the head of the viewer while it is in contact therewith, so that said image display unit body is held just before the face of the viewer, characterized in that:

said ocular system includes, in order from the eye side of the viewer along the visual axis, a first prism having a first surface concave on the eye side and a second surface located on the side of said first prism opposite to the first surface thereof and concave on the eye side with a medium having a refractive index (n) larger than 1 (n>1) interposed therebetween, and a second prism having a third surface concave on the eye side and located on the side of said second prism opposite to the eye side and a medium having a refractive index (n) larger than 1 (n>1), said first prism being designed such that a beam of rays leaving said image display device is reflected at at least said first surface and then propagates through the medium of said first prism in a direction opposite to the eye side, while a beam of rays reflected at said second surface propagates through the medium of said first prism and then transmits through said first surface, wherein said first and said second prisms are cemented together.

2. A head mount type of image display unit including an image display unit body having an image display device for displaying an image and an ocular system for guiding an image displayed on said image display device to the eyeballs of a viewer, and a support member mounted over the head of the viewer while it is in contact therewith, so that said image display unit body is held just before the face of the viewer, characterized in that:

said ocular system includes, in order from the eye side of the viewer along the visual axis, a first prism having a first surface which has a shape concave on the eye side and has an action on both reflecting and transmitting a beam of rays, a second surface located on the side of said first prism opposite to the first surface thereof, which has a shape concave on the eye side and has an action on both reflecting and transmitting a beam of rays and a medium interposed between said first and second surfaces and having a refractive index (n) larger than 1 (n>1), and a second prism having a third surface concave on the eye side and located on the side of said second prism opposite to the eye side and a medium having a refractive index (n) larger than 1 (n>1), wherein said first and second prisms are cemented together.

3. A head mount type of image display unit including an image display unit body having an image display device for displaying an image and an ocular system for guiding an image displayed on said image display device to the eyeballs of a viewer, and a support member mounted over the head of the viewer while it is in contact therewith, so that said image display unit body is held just before the face of the viewer, characterized in that:

said ocular system includes, in order from the eye side of the viewer along the visual axis, a first prism having a first surface concave on the eye side and a second surface located on the side of said first prism opposite to the first surface thereof and concave on the eye side with a medium having a refractive index (n) larger than 1 (n>1) interposed therebetween, and a second prism having a third surface concave on the eye side and located on the side of said second prism opposite to the eye side and a medium having a refractive index (n) larger than 1 (n>1), said first prism being designed such that a beam of rays leaving said image display device is reflected at at least said first surface and then propagates through the medium of said first prism in a direction opposite to the eye side, while a beam of rays reflected at said second surface propagates through the medium of said first prism and then transmits through said first surface, wherein said prism has a total reflection action, so that a beam of rays leaving said image display device undergo total reflection at said first surface and then at said second surface.

4. A head mount type of image display unit including an image display unit body having an image display device for displaying an image and an ocular system for guiding an image displayed on said image display device to the eyeballs of a viewer, and a support member mounted over the head of the viewer while it is in contact therewith, so that said image display unit body is held just before the face of the viewer, characterized in that:

said ocular system includes, in order from the eye side of the viewer along the visual axis, a first prism having a first surface which has a shape concave on the eye side and has an action on both reflecting and transmitting a beam of rays, a second surface located on the side of said first prism opposite to the first surface thereof, which has a shape concave on the eye side and has an action on both reflecting and transmitting a beam of rays and a medium interposed between said first and second surfaces and having a refractive index (n) larger than 1 (n>1), and a second prism having a third surface concave on the eye side and located on the side of said second prism opposite to the eye side and a medium having a refractive index (n) larger than 1 (n>1), wherein said prism has a total reflection action, so that a beam of rays leaving said image display device undergo total reflection at said first surface and then at said second surface.

5. The head mount type of image display unit as recited in claims 1–4, characterized in that the center of curvature of a surface portion of said first surface intersecting the visual axis and the center of curvature of a surface portion of said third surface intersecting the visual axis lie on the same optical axis.

6. The head mount type of image display unit as recited in one of claims 1–4, characterized in that the radius of curvature of a surface portion of said first surface intersecting the visual axis is substantially identical in shape with the radius of curvature of a surface portion of said third surface intersecting the visual axis.

7. The head mount type of image display unit as recited in one of claims 1–4, characterized in that a surface portion of said second surface intersecting the visual axis is stronger in power (or smaller in the radius of curvature) than a surface portion of said third surface intersecting the visual axis.

8. The head mount type of image display unit as recited in one of claims 1–4, characterized in that a dioptric element having power is located on the pupil plane side of said first prism, said image display unit conforming to the following conditions (1) and (2):

$$f_1 > 0 \tag{1}$$

$$|1/R_{01}| < |1/R_{02}| \tag{2}$$

where $f_1$ is the focal length of the dioptric element having power, $R_{01}$ is the radius of curvature thereof on the pupil plane side, and $R_{02}$ is the radius of curvature thereof on the image surface side.

9. The head mount type of image display unit as recited in one of claims 1–4, characterized in that a dioptric element having power is located on the image plane side of said first prism, said image display unit conforming to the following conditions (3), (4) and (5):

$$1/R_{11} < 0 \tag{3}$$

$$1/R_{12} < 0 \tag{4}$$

$$|1/R_{12}| < |1/R_3| \tag{5}$$

where $R_{11}$ is the radius of curvature of the dioptric element having power on the pupil plane side, $R_{12}$ is the radius of curvature thereof on the image plane side, and $R_3$ is the radius of curvature of the semitransparent curved surface of the first prism located on the image plane side.

10. The head mount type of image display unit as recited in one of claims 1–4, characterized by conforming to the following condition (6):

$$0 < f_2/f_1 < 0.42 \quad (6)$$

where $f_2$ is the focal length of the first prism.

11. The head mount type of image display unit as recited in one of claims 1-4, characterized by conforming to the following condition (7):

$$-0.4 < f_2/f_3 < 0.2 \quad (7)$$

where $f_3$ is the focal length of the dioptric element having power, and $f_2$ is the focal length of the first prism.

12. The head mount type of image display unit as recited in one of claims 1-4, characterized in that dioptric elements having power are located on the pupil and image plane sides of said first prism, said image display unit conforming to the following conditions (8) and (9):

$$0 < f_2/f_1 < 1.0 \quad (8)$$

$$-1.2 < f_2/f_3 < 0 \quad (9)$$

where $f_1$ is the focal length of the dioptric element having power, which is located on the pupil plane side, $f_2$ is the focal length of the first prism, and $f_3$ is the focal length of the dioptric element having power, which is located on the image plane side.

* * * * *